United States Patent [19]
Agrawal et al.

[11] Patent Number: 5,643,354
[45] Date of Patent: Jul. 1, 1997

[54] HIGH TEMPERATURE OXYGEN PRODUCTION FOR IRONMAKING PROCESSES

[75] Inventors: Rakesh Agrawal, Emmaus; Michael Shi-Kuan Chen, Zionsville; Arthur Ramsden Smith, Telford, all of Pa.; Robert Michael Thorogood, Cary, N.C.; Thomas Joseph Ward, Orefield, Pa.

[73] Assignee: Air Products and Chemicals, Inc., Allentown, Pa.

[21] Appl. No.: 417,584

[22] Filed: Apr. 6, 1995

[51] Int. Cl.$^6$ .................................................. C21B 11/00
[52] U.S. Cl. ................... 75/490; 75/492; 75/505; 75/958
[58] Field of Search ................ 75/958, 444, 445, 75/466, 491, 492, 505

[56] References Cited

U.S. PATENT DOCUMENTS

| | | | |
|---|---|---|---|
| 4,345,939 | 8/1982 | Ratschat | 75/466 |
| 4,545,787 | 10/1985 | Hegarty | 55/16 |
| 5,035,727 | 7/1991 | Chen | 55/16 |
| 5,118,395 | 6/1992 | Chen et al. | 204/59 |
| 5,174,866 | 12/1992 | Chen et al. | 204/59 |
| 5,245,110 | 9/1993 | Van Dijk et al. | 585/946 |

OTHER PUBLICATIONS

Lemperle, M., Siuka, D., "Cogeneration with COREX®"—AISE Annual Convention, Pittsburgh, PA, Sep. 1991.

Wright, J. D., Copeland, R. J., "Advanced Oxygen Separation Membranes", Report No. TDA–GRI–90/0303, prepared for the Gas Research Institute, Sep. 1990.

Clark, D. J. et al, "Separation of Oxygen by Using Zirconia Solid Electrolyte Membranes" in *Gas Separation and Purification* 1992, vol. 6, No. 4, pp. 201–205.

Dharmadhikari, S., "Understanding Gas Turbine Cycles" in *The Chemical Engineer*, 28 Jan. 1993, pp. 17–20.

*Primary Examiner*—Melvyn Andrews
*Attorney, Agent, or Firm*—John M. Fernbacher

[57] ABSTRACT

A direct ironmaking process in which coal and oxygen are used directly for reducing ore and smelting the resulting sponge iron wherein a high-temperature ion transport membrane process recovers oxygen for use in the ironmaking process. Heat for oxygen recovery is provided by combustion of medium-BTU fuel gas generated by the ironmaking process and/or by heat exchange with hot gas provided by the ironmaking process. The ironmaking and oxygen recovery processes can be integrated with a combined cycle power generation system to provide an efficient method for the production of iron, oxygen, and electric power.

27 Claims, 3 Drawing Sheets

HIGH TEMPERATURE OXYGEN PRODUCTION FOR IRONMAKING PROCESSES

FIELD OF THE INVENTION

The invention addresses the direct production of iron from iron oxides, coal, and oxygen, and in particular the high-temperature recovery of oxygen for use in the ironmaking process.

BACKGROUND OF THE INVENTION

Integrated iron reduction and smelting processes which use coal directly without the need for a separate coking step have been developed in recent years as alternatives to the widely-used blast furnace. These newer ironmaking processes utilize oxygen (typically greater than 95 vol % oxygen) rather than air as used in a blast furnace, and produce two to three times more medium-BTU gas per unit of iron production than a blast furnace. These processes include the COREX® process developed and marketed by Voest-Alpine Industrieanlagenbau and Deutsche Voest-Alpine Industrieanlagenbau, as well as other new or developing direct ironmaking methods such as the ROMELT, HiSMELT®, DIOS, and the AISI In-Bath Smelting processes. Direct ironmaking processes have significant operating and environmental benefits over the conventional blast furnace process. In addition, direct ironmaking processes are well-suited for integration with combined cycle power generation systems which utilize the byproduct medium-BTU gas as primary fuel. The COREX® process, which is representative of these integrated reduction-smelting processes and which is currently in commercial use, is described in a paper entitled "Cogeneration with COREX®" by M. Lemperle and D. Siuka presented at the 1991 AISE Annual Convention, Pittsburgh, Pa, September 1991.

Large volumes of oxygen are required for direct integrated ironmaking processes; the COREX® process for example requires approximately 0.6 to 1.0 ton of oxygen per ton of iron produced. This oxygen typically is produced in a cryogenic air separation process which usually is not integrated with the ironmaking process.

Oxygen can be recovered from air at high temperatures by metal oxide ceramic materials utilized in the form of selectively permeable nonporous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of ion transport membranes is given in a report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. Energy recovery and effective utilization thereof is possible by the integration of compressors, combustors, hot gas turbines, steam turbines, and heat exchangers with the mixed conductor membrane module. Such integrated systems are described in U.S. Pat. Nos. 4,545,787, 5,035,727, 5,118,395, 5,174,866, and U.S. Pat. No. 5,245,110. An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

A combined cycle power generation system is a highly efficient system which utilizes a gas turbine to drive an electric generator, wherein heat is recovered from the turbine exhaust as steam which drives an additional electric generator. A description of typical combined cycle power generation systems is given in *The Chemical Engineer*, 28 Jan. 1993, pp. 17–20. The compressor, combustor, and expansion turbine are carefully designed and integrated to maximize the efficiency of each component and thus the efficiency of the integrated system. Preferably these systems are operated at steady-state design conditions, since significant deviations from these conditions will adversely affect system efficiency.

Integrated coal-based ironmaking processes, combined cycle power generation, and the production of oxygen by high-temperature ion transport membranes are well-suited for integration in highly-efficient systems for the production of iron, electric power, and oxygen. The invention disclosed below and described in the claims which follow advances the art and provides improved methods for the production of iron, electric power, and oxygen by means of integrated direct ironmaking, ion transport membrane, and combined cycle generation systems.

SUMMARY OF THE INVENTION

The present invention is an integrated oxygen-based ironmaking process which comprises partially oxidizing a portion of a carbonaceous feed with an oxidizing gas to generate heat and a hot reducing gas comprising hydrogen and carbon monoxide, heating iron oxide utilizing a first portion of the heat, and reacting the resulting hot iron oxide with the hot reducing gas to yield reduced solid metallic iron and partially reacted reducing gas. A stream of air is compressed and heated, wherein the heating is accomplished at least in part by utilizing a second portion of the heat generated by the partial oxidation of the carbonaceous feed, and the resulting compressed and heated air is passed into a membrane separation zone comprising one or more oxygen-selective ion transport membranes. A hot oxygen permeate stream and a hot oxygen-containing non-permeate stream are withdrawn from the membrane zone. At least a portion of the hot oxygen permeate stream is utilized to provide the oxidizing gas for the partial oxidation of the carbonaceous feed. The hot oxygen permeate stream typically is cooled and compressed before use as the oxidizing gas, and the cooling of the hot oxygen permeate stream can be accomplished by indirect heat exchange with liquid water to generate steam.

The heating of the iron oxide is accomplished by direct contact with the hot reducing gas. The reduced solid metallic iron is melted utilizing a third portion of the heat from partial oxidation of the carbonaceous feed, and carbon from the carbonaceous feed dissolves in the resulting molten iron to yield a molten iron product. A flux material such as limestone is added with the iron oxide in the heating step to capture impurities and keep the slag fluid, and the molten iron is smelted to form molten slag and the molten iron product.

Heating of the air feed to the ion transport membrane can be accomplished at least in part by indirect heat exchange of the air feed with a portion of the hot reducing gas. Heating of the air feed also can be accomplished at least in part by direct or indirect combustion of a portion of the partially reacted reducing gas from the iron oxide reduction step. The carbonaceous feed is selected from the group consisting of coal, coke made from coal, petroleum coke, liquid hydrocarbon, natural gas, and other carbon-containing materials.

In one embodiment of the invention, the hot oxygen-containing non-permeate stream is heated and passed through an expansion turbine to produce shaft power. A portion of the shaft power is used to compress the feed air to the ion transport membrane. Another portion of the shaft power can be used to operate an electric generator to produce electricity. Heating of the hot oxygen-containing non-permeate stream is accomplished by direct combustion with a portion of the partially reacted reducing gas. Preferably, hot exhaust gas from the expansion turbine is used to generate steam by indirect heat exchange of liquid water with the hot exhaust gas, and the steam is expanded through a steam turbine to drive an electric generator to generate additional electricity. Optionally, additional steam can be generated by cooling the hot oxygen permeate stream by indirect heat exchange with liquid water, and the steam is expanded through the steam turbine.

The invention thus integrates the ironmaking and oxygen generation processes by utilizing excess heat and low-BTU gas generated by the ironmaking process to heat the ion transport membrane system. Further, the ironmaking and oxygen generation processes are integrated with a combined cycle power generation system to produce iron, oxygen, and electricity in a highly-efficient manner.

DETAILED DESCRIPTION OF THE INVENTION

Figure 1:
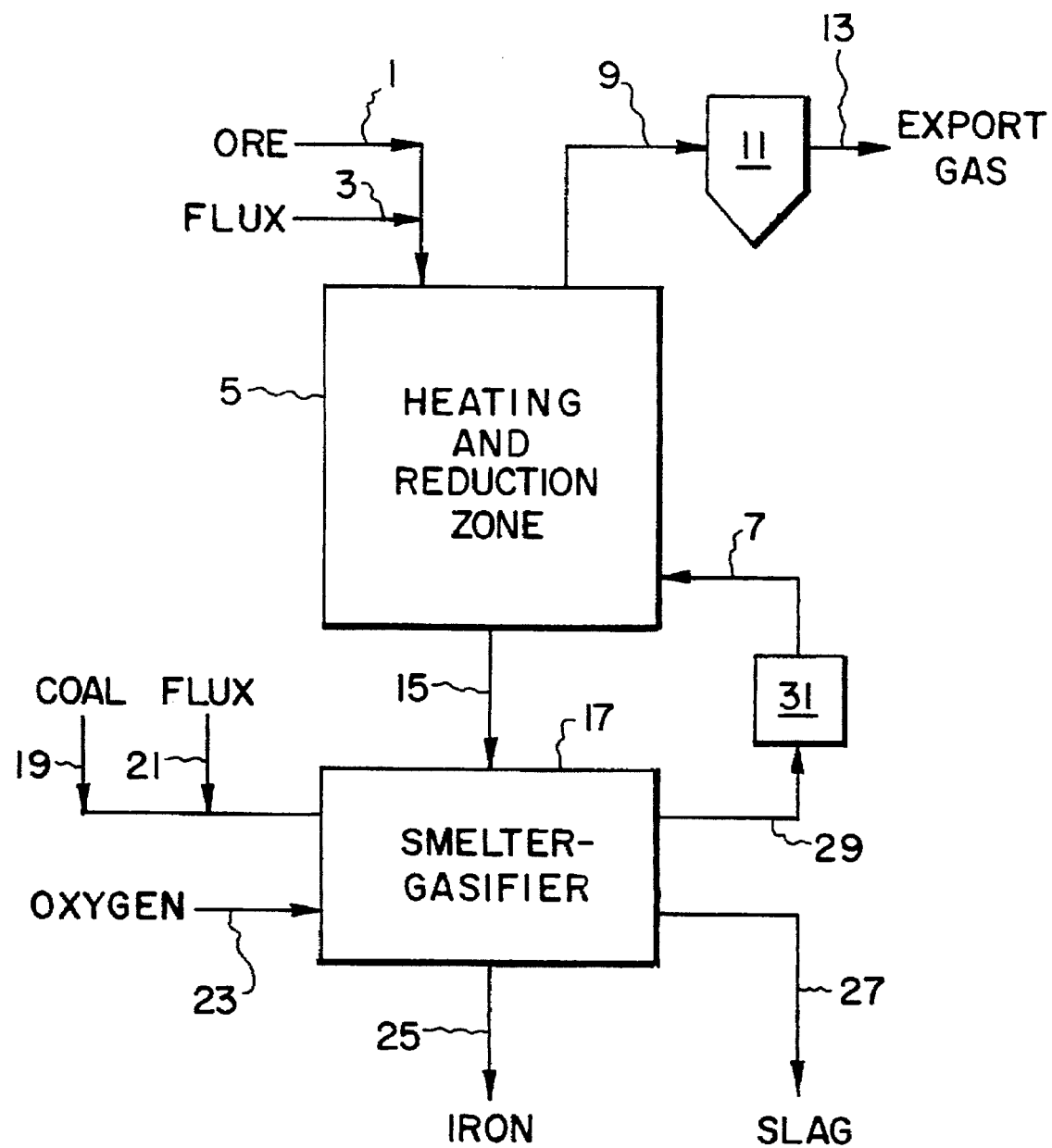
FIG. 1 is a process block diagram of a direct integrated iron production method as is known in the art.

In the direct ironmaking process, iron ore and additives are preheated, the ore is reduced to sponge iron, the sponge iron is melted to produce molten pig iron, and coal is partially oxidized and gasified to produce heat and reducing gas for the reduction step. All of these steps are carried out in a single, continuous, integrated process as illustrated in FIG. 1. Iron ore 1, which essentially is a mixture of iron oxides and nonmetallic materials (gangue), is charged with flux material 3 such as limestone or dolomite to heating and reduction zone 5 in which the solid material is contacted with a stream of hot reducing gas 7 which contains primarily hydrogen and carbon monoxide. The ore and flux material are preheated and the iron oxide reacts with the hydrogen and carbon monoxide in heating and reduction zone 5 to form elemental iron, carbon dioxide, and water at temperatures in the range of 260° C. to 1,300° C. Partially reacted reducing gas 9, which contains hydrogen, carbon monoxide, carbon dioxide, water, and fines is washed and cooled in scrubber 11 to yield cooled export gas 13. This export gas typically has a heating value of 150 to 300 BTU/cu ft.

Combined sponge iron and heated flux material 15 moves into smelter-gasifier 17. Coal 19, flux 21, and oxygen 23 are introduced continuously into smelter-gasifier 17 in which several steps occur simultaneously at temperatures above 1200° C. The sponge iron melts, the coal is partially oxidized and gasified by the oxygen to generate heat and reducing gas, the flux material combines with gangue in the ore and with ash and impurities in the coal to form molten slag, and carbon dissolves in the molten iron. Molten pig iron 25, slag 27, and hot, dust-laden reducing gas 29 are withdrawn from the smelter-gasifier. Reducing gas 29 is treated to remove fines in cleaning zone 31 and cooled (not shown) to the preferred operating temperature of heating and reduction zone 5 to provide reducing gas 7.

The generic direct ironmaking steps described in reference to FIG. 1 can be carried out in any of the ironmaking processes developed in recent years. These processes include the COREX® process developed and marketed by Voest-Alpine Industrieanlagenbau and Deutsche Voest-Alpine Industrieanlagenbau, as well as other new or developing direct ironmaking methods such as the ROMELT, HiSMELT®, DIOS, and the AISI In-Bath Smelting processes.

The present invention is an integrated ironmaking process in which the oxygen required for the melter-gasifier is produced by a high-temperature ion transport membrane from hot compressed air wherein the air is heated by excess heat from the ironmaking process. Air heating can be accomplished by indirect heat exchange between compressed air and hot reducing gas 29 after particulate removal, by indirect heat exchange between the compressed air and partially reacted reducing gas 9, by combusting a portion of export gas 13, or a combination of these heating steps. In addition, the air feed to the ion transport membrane can be using shaft power generated by expansion of the hot pressurized non-permeate gas from the membrane as described below.

The invention is described in detail with reference to FIG. 2 in which the ion transport membrane system is integrated with the earlier-cited COREX® direct ironmaking process. Iron ore and additives 201 are fed to preheating and reduction shaft 203 and flow downward through the shaft against hot upward-flowing reducing gas 205. The additives typically include dolomite and other fluxing agents in amounts up to 10% of the iron ore fed to the system. The iron oxides are reduced in reduction shaft 203 at temperatures between 260° C. to 1000° C. and at pressures typically between 14.7 and 40 psia; partially reacted reducing gas 207 is withdrawn, cooled, and cleaned by contact with water in scrubber 209. Solid reduced metallic iron 211, known as sponge iron, is discharged from reduction shaft 203 into melter-gasifier 213 which operates at temperatures in the range of 1000° C. to 1600° C. and pressures up to 100 psia. Coal and additives 215 are fed into the top of melter-gasifier 213 and oxygen 217 is introduced near the bottom thereof. Oxygen 217 preferably contains at least 90 vol % oxygen. Partial oxidation of the coal with oxygen generates heat and gasifies the coal to produce reducing gas comprising hydrogen and carbon monoxide. The sponge iron melts, and the necessary metallurgical reactions proceed to yield molten slag and pig iron which are withdrawn as 219 and 221 respectively.

Hot, dust-laden reducing gas 222 from the melter-gasifier is combined with a stream of cool reducing gas 223 and the combined cooled gas 225 at 800° C. to 1000° C. passes into hot cyclone 227 which removes coal, ash, and metal fines 229 which are returned to melter-gasifier 213 by inert gas stream 231. A portion 233 of the cooled and cleaned reducing gas is divided to provide reducing gas feed 205 to reduction shaft 203 and reducing gas 235 which is further cooled and cleaned in scrubber 237 to yield cooled reducing gas 239. Another portion 241 of the cooled and cleaned reducing gas from hot cyclone 227 is withdrawn for later process use. Partially reacted reducing gas 243 after cooling and cleaning in scrubber 209 is divided into export gas 245 and fuel gas 247 for additional process use. Slurry streams 238 and 244 containing particulates and water are withdrawn from scrubbers 237 and 209 respectively.

Oxygen 217 is provided by an ion transport membrane system which utilizes heat from the direct ironmaking process to provide the high temperatures required for oxygen recovery. Oxygen 217 can be preheated prior to melter-gasifier 213 if desired by indirect heat exchange with hot reducing gas 233 (not shown). Oxygen-containing gas 249, preferably air, is compressed in compressor 251 to a pressure between 50 and 500 psia, preferably 80 to 300 psia. Compressor 251 is a centrifugal, axial, or reciprocating compressor, optionally multistaged, and optionally intercooled. When operating without intercooling in an adiabatic mode, compressed feed 252 will be at a temperature of 360° F. to 1,100° F.; when operated with intercooling in an isothermal mode, compressed feed 252 will be at 100° F. to 300° F. Compressed feed 256 is preheated in heat exchange zone 255 by indirect heat exchange with hot reducing gas 241 and heated stream 257 passes into direct-fired burner 259. Cooled process stream 242 is returned to the ironmaking process as described later. Burner 259 is a combustor, for example of the type known and used in the gas turbine art, and utilizes fuel gas 261 which is obtained as a portion of fuel gas 247 after compression to 50 to 1,000 psia by compressor 263. Burner 259 is operated with sufficient excess air such that hot combustion stream 265 contains about 10–20 vol % oxygen at a temperature of 800° F. to 2,000° F., preferably 1,000° F. to 1,600° F. Alternatively, burner 259 can be an indirect heater, i.e. a process furnace with internal heat exchange, so that combustion gases do not contact membrane 269 directly. This alternative would be selected if impurities in fuel gas 261 yield compounds in hot combustion product 265 which would degrade membrane 269.

The heating of compressed air 265 to membrane separation zone 267 can be accomplished if desired solely by burner 259 without the use of heat exchange zone 255. Alternatively, if the temperature of reducing gas 241 is sufficiently high relative to the operating temperature of membrane zone 267, burner 259 optionally would not be required and heating would be accomplished solely by heat exchange zone 255.

Hot air stream 265 at 80 to 300 psia passes through the feed side of membrane separation zone 267 comprising membrane 269, preferably a mixed conductor membrane, wherein oxygen diffuses through the membrane driven by an oxygen partial pressure differential in the range of 2 to 80 psi, and high purity oxygen stream 271 containing at least 90 vol % oxygen is withdrawn therefrom at a pressure of at least 2 psia. Hot non-permeate stream 273 is withdrawn at near feed pressure and contains 6 to 18 vol % oxygen.

Membrane 269 operates in the temperature range of 800° F. to 2,000° F., preferably 1,000° to 1,600° F. Membrane separation zone 267 typically is sized and operated such that up to about 80% of the oxygen in membrane feed 265 is recovered as product 271. Alternatively, ion transport membrane 269 can be of the solid electrolyte type as described earlier which is driven by a voltage differential across the membrane in which electrons are conducted through an external circuit with porous electrodes attached to the surfaces of the membrane. In this mode of operation the oxygen permeate product can be recovered at or above the feed pressure.

Ion transport membrane 269 typically comprises a solid ceramic assembly in the form of tubes, sheets, plates, or a monolithic honeycomb. The membrane divides membrane separation zone 267 into a feed side having a higher oxygen partial pressure and a permeate side having a lower oxygen partial pressure. Typical compositions of the active membrane material are given in representative articles by Y. Teraoka et al in *Chemistry Letters*, 1985, pp.1743–1746 and by H. Iwahara et al in *Advances in Ceramics*, Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Preferred membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multi component metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$ where x is between 0 and 1.

Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

Referring again to FIG. 2, nonpermeate stream 273, now containing 6 to 18 vol % oxygen, is combusted with fuel 275 in direct-fired burner 277 (which typically is similar to burner 259) to generate hot combustion product 279 at 800° to 3,000° F. at a pressure between 50 and 1,000 psia. Fuel 275 is obtained as a portion of fuel gas 247 after compression to 50 to 1,000 psia by compressor 263. Hot combustion product 279 is passed through hot gas expansion turbine 281 to generate shaft power, and exhaust 283 is withdrawn therefrom at 800° F. to 1,400° F. and a pressure slightly above atmospheric. Turbine 281 is of the type well-known in the gas turbine art and operates at a compression ratio of between 3 and 68. Preferably, turbine 281 is mechanically linked with compressor 251 by shaft 285 whereby the required compression power is supplied by turbine 281. Optionally, a portion of the shaft power of turbine 281 via shaft 282 is used to produce electricity in generator 284. Optionally, at least a portion of turbine exhaust 283 can be utilized to preheat compressed feed air 252 (not shown). Preferably, turbine exhaust 283 is utilized in heat exchange zone 286 to vaporize boiler feedwater 287 to generate steam 288 at one or more pressure levels in the range of 50 to 2,500 psia. Steam 288 can be exported as a major product, or preferably is expanded in steam turbine 289 to drive generator 290 to produce additional electricity for internal use or export.

Mixed conductor membrane separation zone 267 and expansion turbine 281 can be operated independently at different temperatures by appropriate control of the respective firing rates of direct-fired burners 259 and 277 by controlling the flow rates of fuel gas 261 and 275 respectively. For example, a preferred membrane 269 operates at 1,650° F. while turbine 281 operates most efficiently at a typical inlet temperature of 2,000° F. and the process of the present invention enables independent control of these temperatures by the two direct-fired burners 259 and 277. Alternatively, direct-fired burner 277 can be controlled to produce a specified amount of power from turbine 281.

In an alternative mode of operation, a portion 254 of compressed air 252 bypasses the oxygen recovery step and is combined with hot nonpermeate gas 273 prior to burner 277. In this mode, the firing rate of burner 277 is increased to maintain temperature to expansion turbine 281, which would be sized for a higher inlet gas rate. This mode of operation would be chosen if excess export gas were available and increased power generation were required. In this option, air 254 would be slightly throttled (not shown) or air 252 would be slightly boosted in pressure (not shown) to compensate for pressure drop in heat exchange zone 255 and membrane separation zone 267.

In an optional mode of operation, a portion 253 of compressed air 252 bypasses the oxygen recovery step and is combined with oxygen product 218 (not shown) to produce a lower purity oxygen product. Alternatively, compressed air 253 can be combined with the compressed high-purity oxygen from compressor 280 to yield a lower-purity oxygen stream 217 containing at least 90 vol % oxygen to melter-gasifier 213. This alternative operation reduces the required membrane surface area in membrane separation zone 267 and allows the control of oxygen product purity.

Hot oxygen permeate 271 is cooled, for example by indirect heat exchange with water 272 in heat exchange zone 274 to generate steam 276, and the cooled oxygen 278 is compressed in compressor 280 to 100 to 250 psia to provide oxygen 217 to melter-gasifier 213. Optionally, a portion 218 of the compressed oxygen product from compressor 280 can be withdrawn as a product for external use. Cooled, partially reacted reducing gas streams 239 and 242 are combined into stream 292 which is compressed in compressor 293 to provide cooling gas 223, which then is mixed with hot reducing gas 222 from melter-gasifier 213. Optionally, inert gas 231 for conveying fines 229 into melter-gasifier 213 can be provided by removing residual oxygen from flue gas 291 by any known method and compressing the resulting inert gas to the required pressure (not shown).

Figure 3:
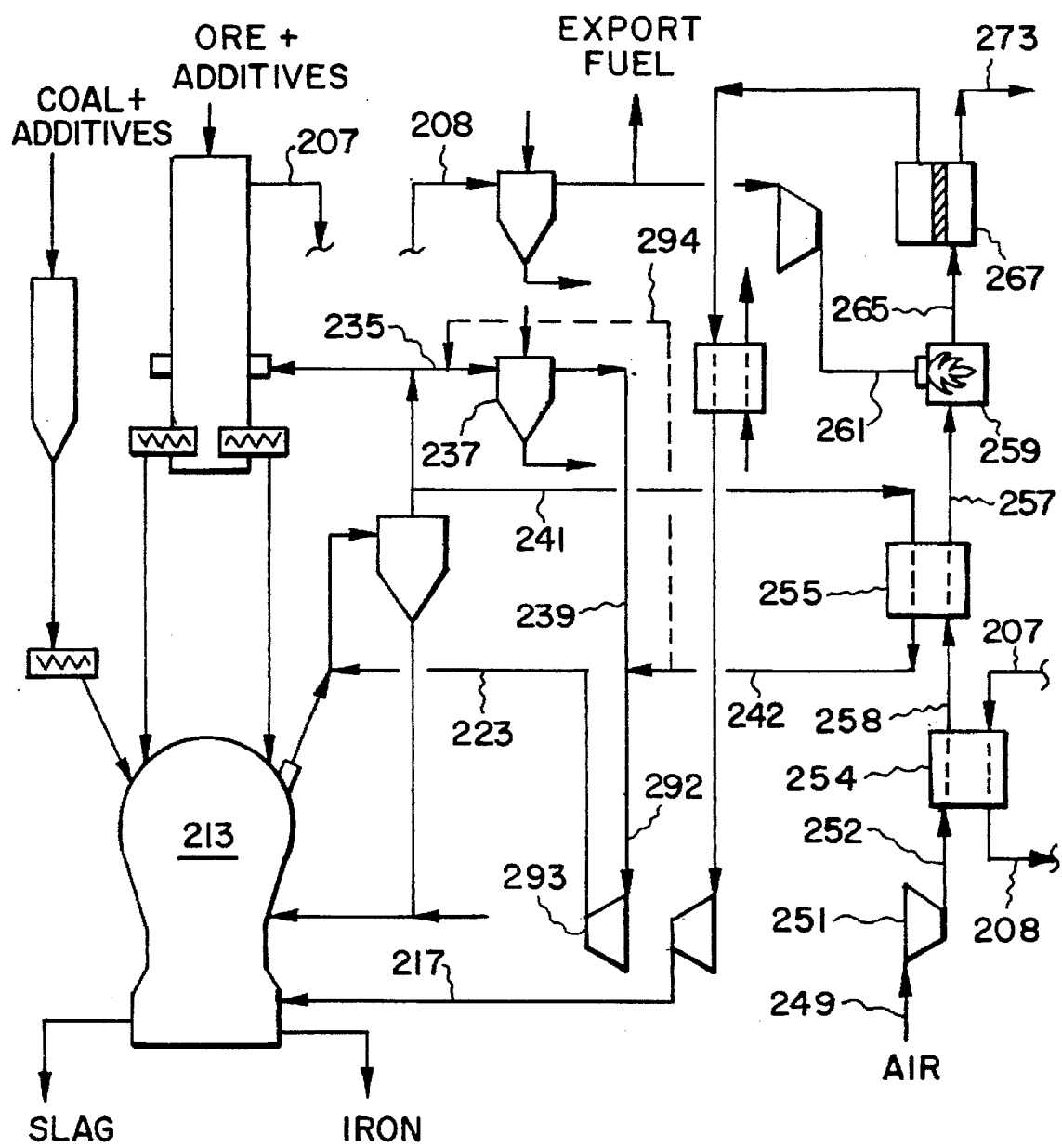
FIG. 3 is a process flow diagram of an alternative embodiment of the present invention illustrating the integration of ironmaking and oxygen production without power generation.

An alternative embodiment of the invention is shown in FIG. 3 in which no electric power is generated and no additional oxygen is produced over that required for the melter-gasifier. In this embodiment, compressed air 252 initially is heated in exchanger 254 by indirect heat exchange with partially reacted reducing gas 207 to yield heated air feed 258, which is further heated against hot gas 241 as earlier described in exchanger 255. Heated air feed stream 257 is further heated by burner 259 firing fuel 261 which is provided by cooled and compressed partially reacted reducing gas 261. Hot feed 265 then passes through the feed side of membrane separation zone 267 and hot non-permeate stream 273 is withdrawn for further use. Such further use may include indirect heat exchange with water to raising steam, indirect heat exchange with compressed oxygen 217 for preheat prior to introduction into melter-gasifier 213, or indirect heat exchange with compressed air 252 for preheat prior to membrane separation zone 267.

Alternatively, compressed air 252 can be heated by one or a combination of any two of the heating means selected from heat exchanger 254, heat exchanger 255, and burner 259. For example, if desired the entire heating of compressed air 252 can be accomplished by burner 259, and heat exchangers 254 and 255 would not be required. If the temperature of cooled process stream 242 is at a temperature such that combined stream 292 is too hot for proper operation of compressor 293, a portion 294 of stream 242 can be combined with stream 235 before cooling and scrubbing in scrubber 237.

EXAMPLE

Figure 2:
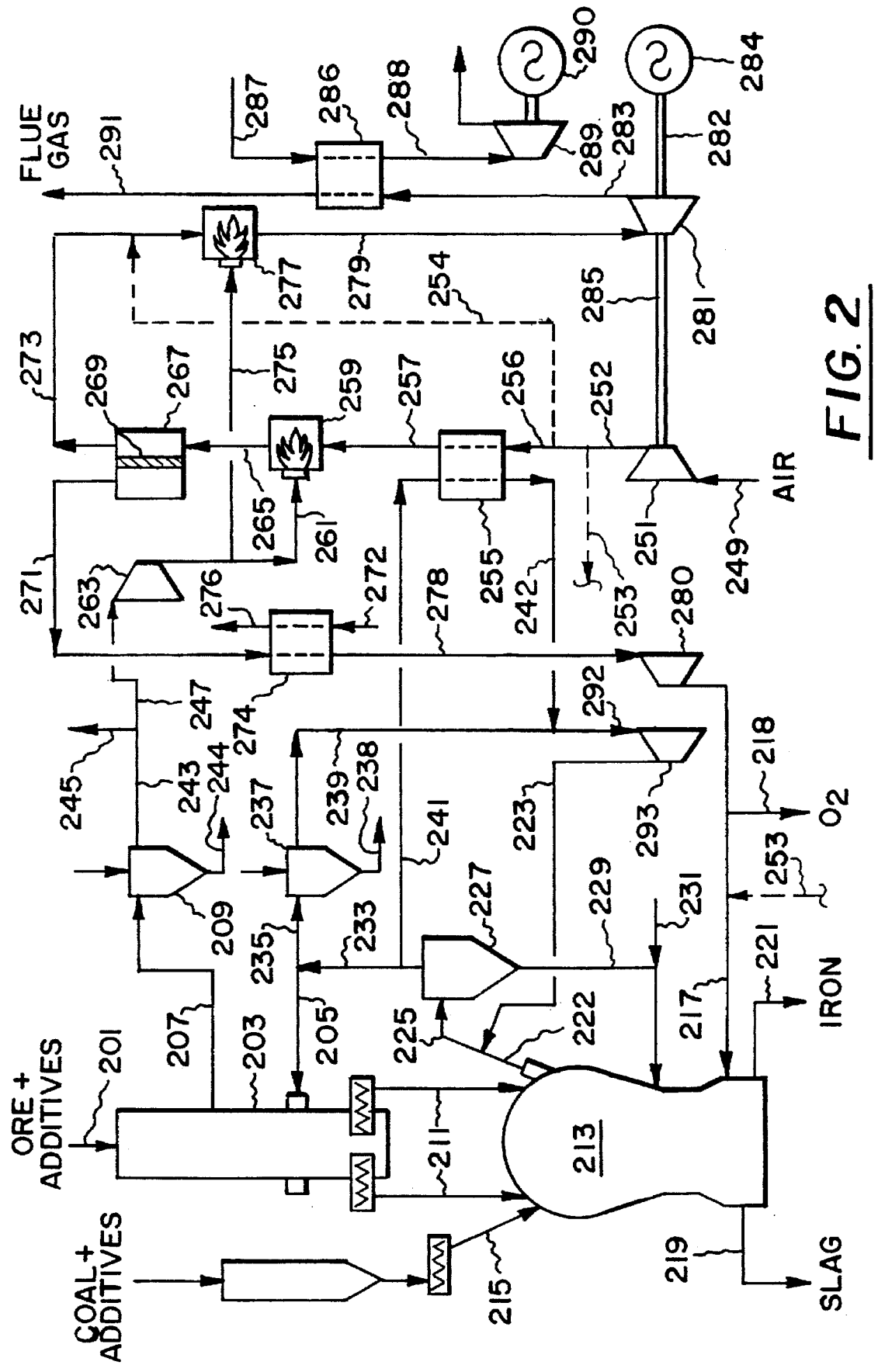
FIG. 2 is a process flow diagram of the present invention illustrating the integration of the direct ironmaking, oxygen production, and power generation processes.

A heat and material balance was carried out to illustrate the invention according to FIG. 2 and the results are summarized in Table 1. Coal plus additives 215 (119,100 lb/hr) are reacted with oxygen 217 (99,900 lb/hr) in smelter/gasifier 213 at a pressure of 80 psia to melt iron therein and generate hot reducing gas. Membrane separation zone 267 is operated at 870° C. with a feed pressure of 200 psia and a permeate pressure of 198 psia. Reducing gas 205 after partial cooling is used in preheating/reduction shaft 203 to heat and reduce iron ore plus additives 201 (200,800 lb/hr). The net products of the system are 113,400 lb/hr of iron 221, 38,600 lb/hr of slag 219, 54,500 lb/hr of export fuel gas 245, and 1,116,400 lb/hr of flue gas 291 from turbine 281. Air feed of 1,041,000 lb/hr generates 99,900 lb/hr of oxygen 217 via membrane zone 267 which is sufficient to supply the required amount of oxygen for the process operation. No export oxygen 218 is produced in this Example. Export fuel gas 245 is produced at the rate of 54,500 lb/hr. For each ton of iron 221 produced, 0.88 ton of oxygen 217 is consumed, 0.48 ton of export fuel gas 245 is produced, and 1.02 MWhr of energy is generated by electric generator 284. The total heat duties for oxygen cooler 274 and flue gas cooler 286 are 36.9 and 286.0 million BTU/hr respectively.

TABLE 1

HEAT AND MASS BALANCE FOR EXAMPLE

| Stream No. | Description | Temperature, °F. | Pressure, psia | Mass Flow, Thousand lb/hr. |
|---|---|---|---|---|
| 201 | Ore and additives | 80 | | 200.8 |
| 215 | Coal and additives | 80 | | 119.1 |
| 217 | Oxygen | 200 | 115 | 99.9 |
| 219 | Slag | 2,750 | | 38.6 |
| 221 | Iron Product | 2,700 | | 113.4 |
| 238 & 244 | Waste solids (ex. water) | 80 | | 38.0 |
| 243 | Clean fuel gas | 80 | 20 | 229.8 |
| 245 | Export fuel gas | 80 | 20 | 54.5 |
| 247 | Fuel gas to burner | 80 | 20 | 175.3 |
| 249 | Air feed | 59 | 14.7 | 1,041.0 |
| 271 | Oxygen cooler inlet | 1,600 | 16 | 99.9 |
| 291 | Flue gas | 220 | 14.7 | 1,116.4 |

While the invention as described above is illustrated in integration with the COREX® direct ironmaking process, oxygen recovery by an ion transport membrane system can be integrated with any ironmaking process which uses oxygen and generates sufficient amounts of excess heat. The principles of integration described above can be utilized with other new or developing direct ironmaking methods including the ROMELT, HiSMELT®, DIOS, and the AISI In-Bath Smelting processes. In addition, the principles of the present invention can be utilized with a modified blast furnace which utilizes the direct injection of fuels such as coal, oil, natural gas, and blast furnace top recycle gas in combination with oxygen. In this application of the invention, the fuel replaces or augments a portion of the metallurgical coke used in the blast furnace, and the oxygen is added to replace or augment the oxygen normally supplied to the blast furnace as air.

Oxygen recovery by ion transport membrane systems can be utilized in conjunction with integrated with direct reduced iron (DRI) processes which reduce iron ore to yield a solid reduced metallic iron product (sponge iron) for further processing. DRI product can be used as feed for electric furnace steelmaking and foundry operations, as a replacement for scrap in open hearth furnaces, and for increasing productivity and reducing coke ratio in blast furnaces and other smelting processes. The DRI process utilizes reducing gas comprising hydrogen and carbon monoxide which is generated in a separate step, and the reducing gas is contacted with iron ore to yield reduced metallic iron and partially reacted reducing gas containing hydrogen, carbon monoxide, carbon dioxide, and water. DRI process technology is well-known and is described for example in the *Encyclopedia of Chemical Technology*, Third Edition, Vol 13, pp. 754–763, John Wiley & Sons, 1981. Reducing gas can be generated by partial gasification of liquid hydrocarbons or by coal gasification, both of which require high purity oxygen.

In an alternative mode of the present invention, oxygen is recovered by an ion transport membrane system as described above and used to generate reducing gas by any known partial oxidation or coal gasification process. The reducing gas is used to convert iron ore to a reduced solid metallic iron product in any known DRI process, and the partially reacted offgas is cleaned and combusted to provide heat for operation of the ion transport membrane system. Less heat is required in the DRI process than in direct ironmaking processes such as the COREX® process earlier described because the smelting step is omitted, and therefore less carbon and oxygen are consumed in the DRI process. However, the principle of integration of the DRI process with the ion transport membrane system for oxygen production is similar to that earlier described for the COREX® process.

Thus the essential feature of the present invention is that the oxygen required for either the integrated direct ironmaking process or the direct reduced iron (DRI) process is produced at high temperature using heat and/or fuel gas generated in the ironmaking or iron reduction process. In addition, the nature of the ionic transport membrane is such that the nitrogen-enriched byproduct gas, i.e. nonpermeate stream 273, is withdrawn in a hot and pressurized state which is ideally suited for energy recovery in a combustion turbine system. The integration of the oxygen separation and ironmaking processes in turn is well-suited for further integration with combined cycle power generation, and results in a highly-efficient method for the production of iron, oxygen, and electric power. Optionally, the integrated system can be designed to provide oxygen, medium-BTU fuel gas, and steam as one or more additional products for export.

The essential characteristics of the present invention are described completely in the foregoing disclosure. One skilled in the art can understand the invention and make various modifications thereto without departing from the basic spirit thereof, and without departing from the scope of the claims which follow.

We claim:

1. An integrated oxygen-based ironmaking process which comprises the steps of:

(a) partially oxidizing at least a portion of a carbonaceous feed with an oxidizing gas to generate hydrogen, carbon monoxide, and heat to yield a hot reducing gas comprising said hydrogen and carbon monoxide, (b) heating iron oxide utilizing a first portion of said heat to form hot iron oxide and reacting said hot iron oxide with said hot reducing gas to yield reduced solid metallic iron and partially reacted reducing gas;

(c) compressing and heating a stream of air, wherein said heating is accomplished at least in part by utilizing a second portion of said heat to yield compressed and heated air, passing said compressed and heated air into a membrane separation zone comprising one or more oxygen-selective ion transport membranes, and withdrawing therefrom a hot oxygen permeate stream and a hot oxygen-containing non-permeate stream; and (d) utilizing at least a portion of said hot oxygen permeate stream to provide said oxidizing gas in step (a).

2. The process of claim 1 wherein heating of said iron oxide is accomplished by direct contact with said hot reducing gas.

3. The process of claim 1 which further comprises the step of:

(e) melting said reduced solid metallic iron utilizing a third portion of said heat and dissolving another portion of said carbonaceous feed in the resulting molten iron to yield a molten iron product.

4. The process of claim 3 which further comprises heating a flux material with said iron oxide in step (b) and reacting said flux with said molten iron to form a molten slag in step (e).

5. The process of claim 1 which further comprises cooling and compressing said hot oxygen permeate stream to yield a cooled and compressed oxygen permeate stream, at least a portion of which provides said oxidizing gas.

6. The process of claim 5 which further comprises heating said cooled and compressed oxygen permeate stream by indirect heat exchange with a portion of said hot reducing gas from step (a).

7. The process of claim 5 wherein said cooling of the hot oxygen permeate stream is accomplished by indirect heat exchange with liquid water to generate steam.

8. The process of claim 5 which further comprises withdrawing a portion of the compressed and heated air of step (c) and blending said portion with said oxidizing gas prior to step (d).

9. The process of claim 1 wherein said heating in step (c) is accomplished at least in part by indirect heat exchange of said stream of air with a portion of said hot reducing gas from step (a).

10. The process of claim 1 wherein said heating in step (c) is accomplished at least in part by direct or indirect combustion of a portion of said partially reacted reducing gas from step (b).

11. The process of claim 1 wherein said heating in step (c) is accomplished at least in part by indirect heat exchange of said stream of air with a portion of said hot oxygen-containing non-permeate stream.

12. The process of claim 1 wherein said carbonaceous feed is selected from the group consisting of coal, coke made from coal, petroleum coke, liquid hydrocarbon, and natural gas.

13. The process of claim 1 which further comprises heating said hot oxygen-containing non-permeate stream, passing the resulting heated stream through an expansion turbine to produce shaft power, and withdrawing hot exhaust gas therefrom.

14. The process of claim 13 wherein a portion of said shaft power is used to compress said stream of air in step (c).

15. The process of claim 13 wherein a portion of said shaft power is used to operate an electric generator to produce electricity.

16. The process of claim 13 wherein heating of said hot oxygen-containing non-permeate stream is accomplished by direct combustion of a portion of said partially reacted reducing gas with said hot oxygen-containing non-permeate stream.

17. The process of claim 13 which further comprises generating steam by indirect heat exchange of liquid water with said hot exhaust gas, and expanding said steam through a steam turbine to drive an electric generator and generate additional electricity.

18. The process of claim 17 which further comprises cooling said hot oxygen permeate stream by indirect heat exchange with liquid water to generate additional steam which is expanded through said steam turbine.

19. In the production of iron by partially oxidizing at least a portion of a carbonaceous feed with an oxidizing gas to generate hydrogen, carbon monoxide, and heat to yield a hot reducing gas comprising said hydrogen and carbon monoxide, heating iron oxide utilizing a first portion of said heat to form hot iron oxide, and reacting said hot iron oxide with said hot reducing gas to yield reduced solid metallic iron and partially reacted reducing gas, said oxidizing gas is provided by the steps of:

(a) compressing and heating a stream of air, wherein said heating is accomplished at least in part by utilizing a second portion of said heat;

(b) passing the resulting compressed and heated air into a membrane separation zone comprising one or more oxygen-selective ion transport membranes; and (c) withdrawing therefrom a hot oxygen permeate stream and a hot oxygen-containing non-permeate stream, wherein at least a portion of said hot oxygen permeate stream provides said oxidizing gas.

20. The process of claim 19 wherein heating of said iron oxide is accomplished by direct contact with said hot reducing gas.

21. The process of claim 19 which further comprises the step of:

(e) melting said reduced solid metallic iron utilizing a third portion of said heat and dissolving another portion of said carbonaceous feed in the resulting molten iron to yield a molten iron product.

22. The process of claim 21 which further comprises heating a flux material with said iron oxide in step (b) and reacting said flux with said molten iron to form a molten slag in step (e).

23. The process of claim 19 which further comprises cooling and compressing said hot oxygen permeate stream to provide said oxidizing gas.

24. In the production of iron by partially oxidizing at least a portion of a carbonaceous feed with an oxidizing gas to generate hydrogen, carbon monoxide, and heat to yield a hot reducing gas comprising said hydrogen and carbon monoxide, heating iron oxide utilizing a first portion of said heat to form hot iron oxide, and reacting said hot iron oxide with said hot reducing gas to yield reduced solid metallic iron and partially reacted reducing gas, said oxidizing gas is provided by the steps of:

(a) compressing and heating a stream of air, wherein said heating is accomplished by direct or indirect combustion of a portion of said partially reacted reducing gas;

(b) passing the resulting compressed and heated air into a membrane separation zone comprising one or more oxygen-selective ion transport membranes; and (c) withdrawing therefrom a hot oxygen permeate stream and a hot oxygen-containing non-permeate stream, wherein at least a portion of said hot oxygen permeate stream provides said oxidizing gas.

25. The process of claim 24 which further comprises the step of:

(e) melting said reduced iron utilizing a third portion of said heat and dissolving carbon in the resulting molten iron to yield a molten iron product, wherein said carbon is provided by another portion of said carbonaceous feed.

26. The process of claim 25 which further comprises heating a flux material with said iron oxide in step (b) and reacting said flux with said molten iron to form a molten slag in step (e).

27. The process of claim 24 which further comprises cooling and compressing said hot oxygen permeate stream to provide said oxidizing gas.

* * * * *